(12) United States Patent
Ko

(10) Patent No.: US 6,571,826 B2
(45) Date of Patent: Jun. 3, 2003

(54) CERAMIC VALVE IN COMBINATION WITH CONNECTION MOUNT FOR A SINGLE OUTLET FAUCET

(75) Inventor: Hsi Chia Ko, Changhua Hsien (TW)

(73) Assignee: Chung Cheng Faucet Co., Ltd., Changhua Hsien (TW)

( * ) Notice: Subject to any disclaimer, the term of this patent is extended or adjusted under 35 U.S.C. 154(b) by 0 days.

(21) Appl. No.: 09/945,741

(22) Filed: Sep. 5, 2001

(65) Prior Publication Data

US 2003/0041907 A1 Mar. 6, 2003

(51) Int. Cl.[7] .............................................. F16K 11/078
(52) U.S. Cl. .............................. 137/625.17; 137/625.4; 137/454.6
(58) Field of Search ........................ 137/454.6, 625.17, 137/625.4

(56) References Cited

U.S. PATENT DOCUMENTS

| | | | | |
|---|---|---|---|---|
| 4,513,781 A | * | 4/1985 | Nikolayczik | 137/625.17 |
| 4,733,694 A | * | 3/1988 | Knapp | 137/625.17 |
| 4,942,902 A | * | 7/1990 | Knapp | 137/454.6 |
| 4,979,539 A | * | 12/1990 | Rohr | 137/454.6 |
| 5,320,129 A | * | 6/1994 | Bosio | 137/625.17 |
| 5,368,071 A | * | 11/1994 | Hsieh | 137/625.17 |
| 5,404,911 A | * | 4/1995 | Tres Casas | 137/625.17 |
| 6,029,690 A | * | 2/2000 | Weineland et al. | 137/625.17 |
| 6,394,133 B1 | * | 5/2002 | Knapp | 137/625.17 |

* cited by examiner

Primary Examiner—John Rivell
(74) Attorney, Agent, or Firm—Troxell Law Offices PLLC

(57) ABSTRACT

A ceramic valve in combination with a connection mount is provided. The ceramic valve has a bottom seat with a seal ring disposed on the external periphery thereof. There are two supporting lugs, a cold water inlet tube, a hot water inlet tube and a water outlet extended from the bottom of the bottom seat. Both the cold and hot water inlet tubes have a short extended insertion section and also have a seal ring at their ends respectively. The connection mount and the water outlet conduct are integrally produced. The connection mount has a cold water inlet, a hot water inlet and a water outlet and is provided with an externally threaded journal section at the top thereof. Whereby the assembly of the components can be completed with speed and ease without finely machining insertion grooves, resulting in the saving of production time, labor and cost. No specific orientation must be check in assembly to make the assembly easy and quick.

1 Claim, 4 Drawing Sheets

CERAMIC VALVE IN COMBINATION WITH CONNECTION MOUNT FOR A SINGLE OUTLET FAUCET

BACKGROUND OF THE INVENTION

The present invention relates to a ceramic valve in combination with a connection mount. The ceramic valve has a bottom seat with a seal ring disposed on the external periphery thereof. There are two supporting lugs, a cold water inlet tube, a hot water inlet tube and a water outlet extended from the bottom of the bottom seat. Both the cold and hot water inlet tubes have a short extended insertion section and also have a seal ring at their ends respectively. The connection mount and the water outlet conduct are integrally produced. The connection mount has a cold water inlet, a hot water inlet and a water outlet and is provided with an externally threaded journal section at the top thereof. Whereby the assembly of the components can be completed with speed and ease without finely machining insertion grooves, resulting in the saving of production time, labor and cost. No specific orientation must be check in assembly to make the assembly easy and quick.

There are two kinds of prior arts disclosed in FIGS. 1, 2. Referring first to FIG. 1, the first prior art includes a control head portion 10, an engagement retainer 20, a ceramic valve 30, a connection mount 40 and a water outlet conduct 50. The control head portion 10 has a handle 11. The engagement retainer 20 has an internally threaded section 21. The ceramic valve 30 has a bottom section 31 having a seal ring 32 disposed therearound. There are two insertion projections 33, a cold water inlet flange 34, a hot water inlet flange 35 and a water outlet 36 extended from the underside of the bottom section 31. The connection mount 40 has two insertion recesses 41, a cold water inlet hole 42, a hot water inlet hole 43 and a water outlet hole 44 and an externally threaded flange 45. In assembly, the engagement retainer 20 is first engaged with the control head portion 10 and then the ceramic valve 30 is housed in the engagement retainer 20 with the two insertion projections 33 thereof are correctly oriented and inserted into the two insertion recesses 41. Accordingly, the cold, hot water inlet flanges 34, 35 of the ceramic valve 30 are in alignment and engagement with the cold, hot water inlet holes 42, 43 respectively. The externally threaded flange 45 is in locking engagement with the internally threaded section 21 of the engagement retainer 20, and the connection mount 40 is placed into the water outlet conduct 50 to complete the assembly.

Referring to FIG. 2, the second prior art mainly includes a control head portion 10, an engagement retainer 20, a ceramic valve 30, a connection mount 40 and a water outlet conduct 50. The control head portion 10 has a handle 11. The engagement retainer 20 has an internally threaded section 21. The ceramic valve 30 has a bottom section 31 having a seal ring 32 disposed therearound. There are two supporting projections 33, a cold water inlet tube 37, a hot water inlet tube 38 and a water outlet 36 extended from the underside of the bottom section 31. Each supporting projections 33 has an insertion leg 331. The cold, hot water inlet tubes 37, 38 are provided with a seal ring 39 respectively. The connection mount 40 and the water outlet conduct 50 are integrally formed. The connection mount 40 has two insertion recesses 41, a cold water inlet hole 42, a hot water inlet hole 43 and a water outlet hole 44 and an externally threaded flange 45. In assembly, the engagement retainer 20 is first engaged with the control head portion 10 and then the ceramic valve 30 is housed in the engagement retainer 20 with the two insertion legs 331 of the supporting projections 33 thereof are correctly oriented and inserted into the two insertion recesses 41. Accordingly, the cold, hot water inlet tubes 37, 38 of the ceramic valve 30 are in alignment and engagement with the cold, hot water inlet holes 42, 43 respectively. The externally threaded flange 45 is in locking engagement with the internally threaded section 21 of the engagement retainer 20 to complete the assembly.

In both the above described two prior art structures, the connection mount 40 has to be finely machined of its insertion recesses 41 after casting so as to permit the engagement of the supporting projections 33 and the insertion legs 331 with the recesses when the cold, hot water inlet holes 42, 43 of the connection mount 40 are in alignment and engagement with the cold, hot water inlet flanges 34, 35 (or the cold, hot water inlet tubes 37, 38). In assembly, the cold, hot water inlet flanges 34, 35 or the cold, hot water inlet tubes 37, 38 have to be aligned and engaged with the cold, hot water inlet holes 42, 43; and the supporting projections 33 or the insertion legs 331 of the ceramic valve 30 must be oriented to engage with the insertion recesses 41 of the connection mount 40. Such alignment and engagement are not ready and relatively tedious.

SUMMARY OF THE INVENTION

Therefore, the primary object of the present invention is to provide a ceramic valve in combination with a connection mount for a single outlet faucet which is not finely processed of its insertion groove after the casting of the connection mount, resulting in reduction of production time and integral cost.

Another object of the present invention is to provide a ceramic valve in combination with a connection mount for a single outlet faucet wherein no specific orientation must be checked in assembly and only the insertion pins of the hot and cold water inlet tubes are directly planted in the cold and hot water inlet holes to complete the assembly with speed and facility.

DETAILED DESCRIPTION OF THE PREFERRED EMBODIMENTS

Figures 1, 1A:
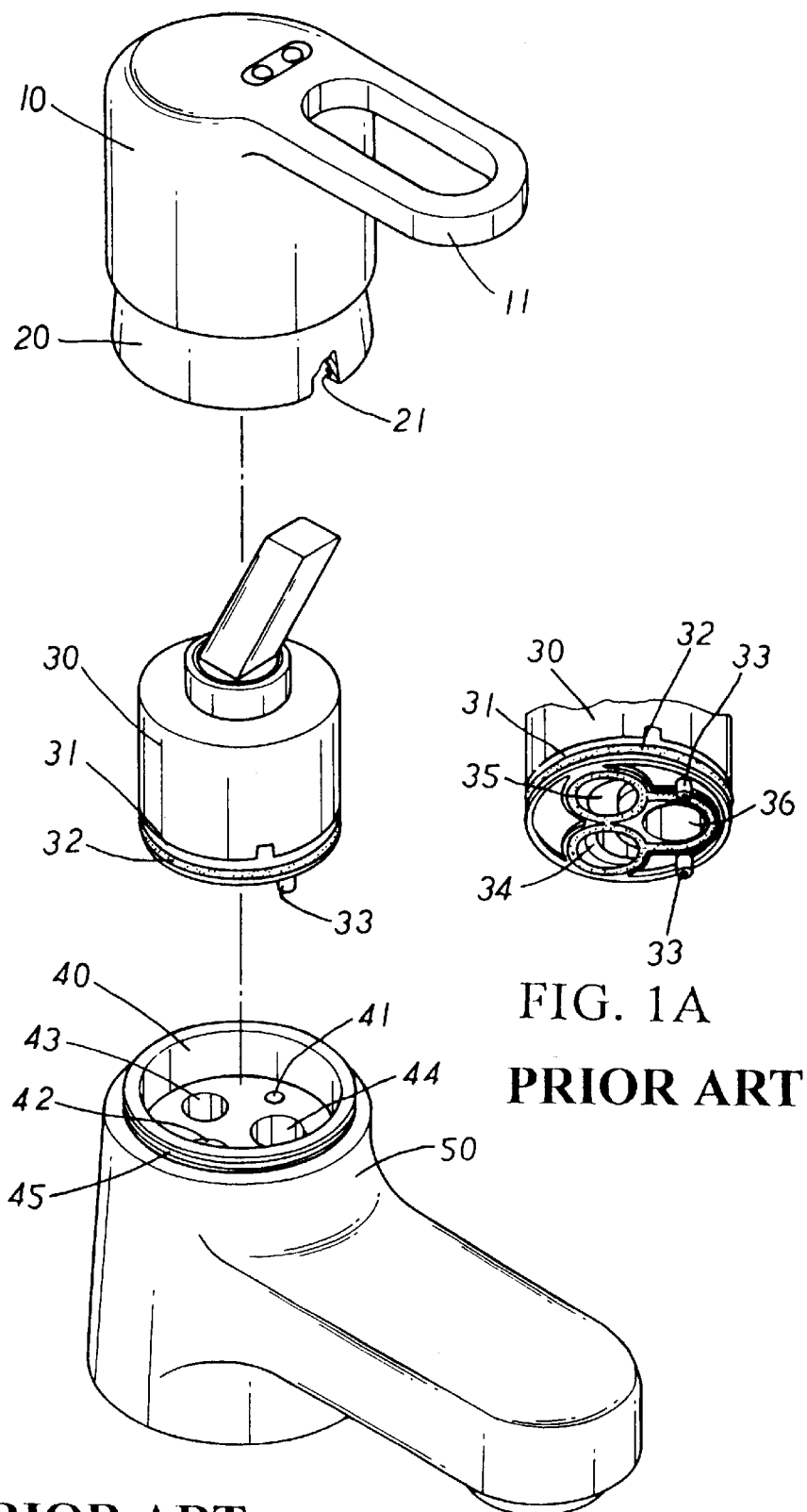
FIG. 1 is a perspective diagram showing the exploded components of a first prior art structure.
FIG. 1A is a perspective diagram showing the bottom of the ceramic valve of FIG. 1.
Figures 2, 2A:
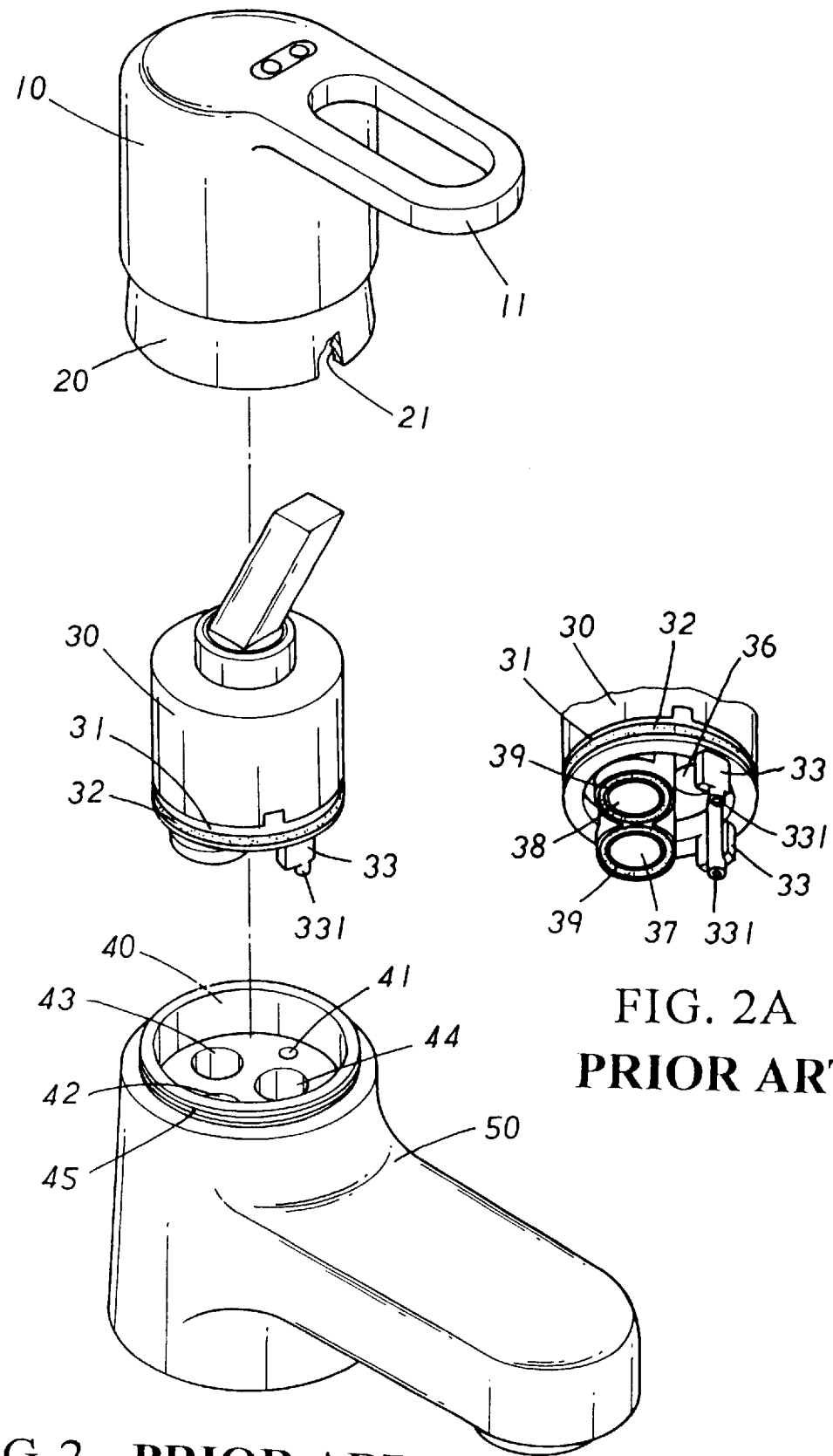
FIG. 2 is a perspective diagram showing the exploded components of a second prior art structure.
FIG. 2A is a perspective diagram showing the bottom of the ceramic valve of FIG. 2.
Figure 3:
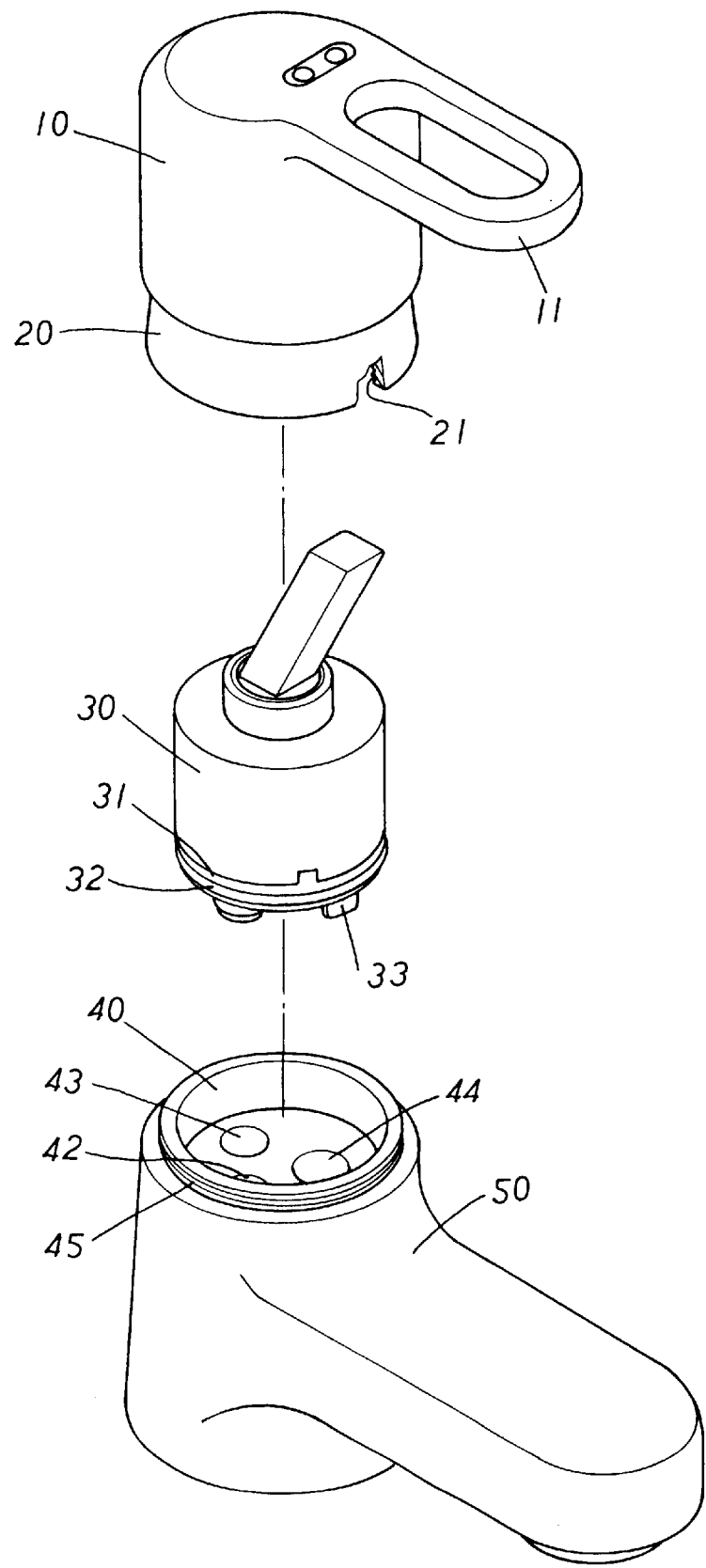
FIG. 3 is a perspective diagram showing the exploded components of the present invention.
Figure 4:
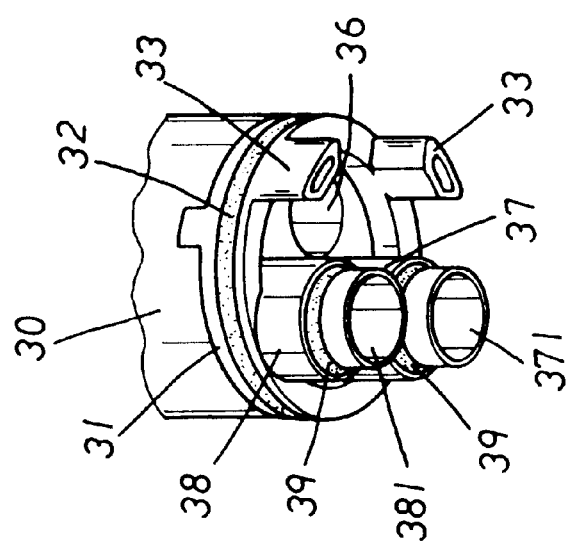
FIG. 4 is a perspective diagram showing the view taken from the bottom of the present invention.

Referring to FIGS. 3, 4, the exploded components and the assembly of the present invention are illustrated in a perspective manner. It mainly comprises a control head portion 10, an engagement element 20, a ceramic valve 30 and a connection mount 40, a water outlet conduct 50.

The control head portion 10 has a control handle 11 and the engagement element 20 engaged with bottom of the control head portion 10 has an internally threaded periphery 21. The ceramic valve 30 has a bottom seat 31 with a seal ring 32 disposed on the external periphery thereof. There are two arc-shaped hollow supporting lugs 33, a cold water inlet tube 37, a hot water inlet tube 38 and a water outlet 36 extended from the bottom of the bottom seat 31. Both the cold and hot water inlet tubes 37, 38 have a short extended insertion section 371, 381 and also have a seal rings 39 at their ends respectively. The connection mount 40 and the water outlet conduct 50 are integrally produced.

The connection mount 40 has a cold water inlet 42, a hot water inlet 43 and a water outlet 44 and is provided with an externally threaded journal section 45 at the top thereof.

Figure 5:
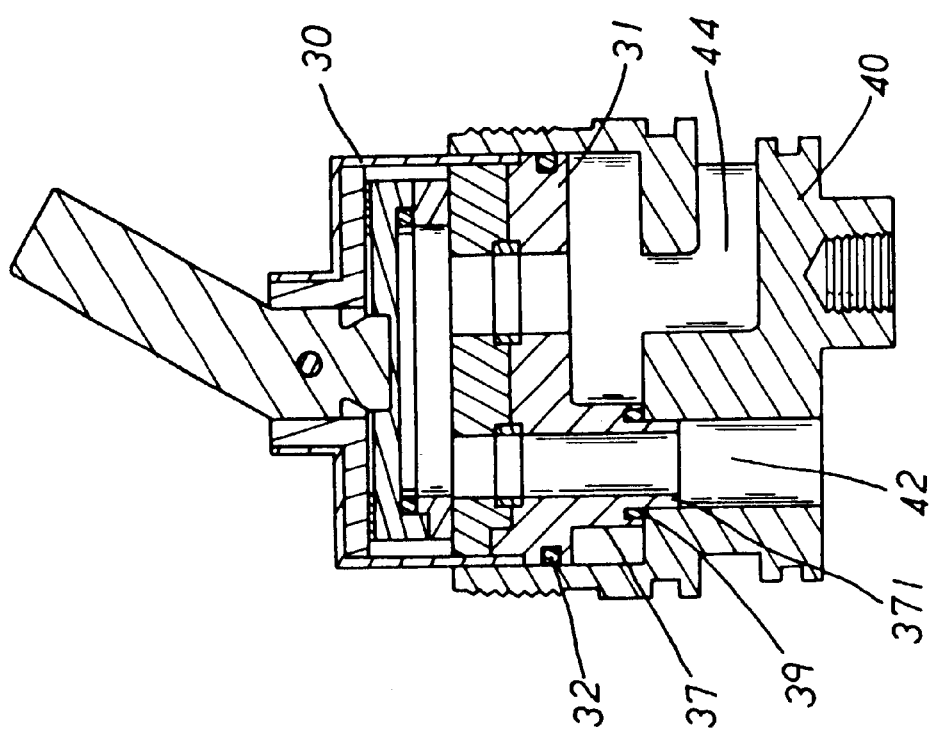
FIG. 5 is a sectional diagram of the assembly of the present invention.

Referring to FIG. 5, the sectional diagram of the present invention shows that in the assembly, the engagement element 20 is first put into the interior of the control head portion 10, and then the ceramic valve 30 is engaged with the engagement element 20 with the insertion sections 371, 381 of the cold, hot water inlet tubes 37, 38 in direct insertion engagement with the cold, hot water inlets 42, 43 of the connection mount 40. The supporting lugs 33 of the ceramic valve 30 are retained in place on the connection mount 40 and the threaded journal section 45 of the connection mount 40 in connection to the water outlet conduct 50 is in retaining engagement with the internally threaded periphery 21 of the engagement element 20 to complete the assembly.

It can be apparently seen that the present invention has two features given as below:

1. The connection mount needs no fine machinery after it is cast in and removed from a mold, resulting in time saving and integral production cost.

2. In assembly, it is not required to check the orientation of the assembled components, making the assembly easy, speedy and convenient.

I claim:

1. A ceramic valve in combination with a connection mount for a single outlet faucet wherein said ceramic valve has a seal ring disposed about a bottom periphery thereof and a pair of supporting lugs, a cold water inlet tube, a hot water inlet tube and a water outlet at the bottom thereof; said connection mount and a water outlet conduct are integrally formed with a cold water inlet and a hot water inlet and a water outlet defined therein; said ceramic valve has both said cold and hot water inlet tubes provided with short extended insertion sections and also has a seal ring at their ends respectively; the pair of supporting lugs being arc-shaped, hollow and extending from the periphery of said ceramic valve;

said connection mount has no insertion grooves defined thereon and is not finely machined after cast;

whereby in the assembly said ceramic valve is engaged with an engagement element with said insertion sections of said cold, hot water inlet tubes in direct insertion engagement with said cold, hot water inlets of said connection mount so that said connection mount is cast without further fine machinery to make production time, labor and cost effectively reduced.

* * * * *